(12) United States Patent
Nelson et al.

(10) Patent No.: US 8,906,482 B2
(45) Date of Patent: Dec. 9, 2014

(54) STACKABLE WEIGHTS FOR LIGHTER-THAN-AIR BALLOONS

(75) Inventors: David C. Nelson, Akron, OH (US); Wesley A. Schroeder, Seville, OH (US)

(73) Assignee: Premium Balloon Accessories, Inc., Sharon Center, OH (US)

( * ) Notice: Subject to any disclaimer, the term of this patent is extended or adjusted under 35 U.S.C. 154(b) by 265 days.

(21) Appl. No.: 13/415,878

(22) Filed: Mar. 9, 2012

(65) Prior Publication Data

US 2013/0236663 A1    Sep. 12, 2013

(51) Int. Cl.
*B32B 1/08* (2006.01)

(52) U.S. Cl.
USPC .......................................... 428/99; 428/34.1

(58) Field of Classification Search
CPC ............. B32B 1/08; A63H 27/10; B64B 1/70

USPC ................................................... 428/99, 34.1
See application file for complete search history.

(56) References Cited

U.S. PATENT DOCUMENTS 3,841,528 A * 10/1974 Eisenberg ..................... 222/143

* cited by examiner

*Primary Examiner* — Brent O'Hern
(74) *Attorney, Agent, or Firm* — Renner Kenner Greive Bobak Taylor & Weber

(57) ABSTRACT

An adjustable weight for tethering lighter-than-air balloons that may include a plurality of individual weights secured together by a friction fit. The weights each have a top wall and a side wall extending from a periphery of the top wall. The side wall includes a top tier adjacent to the top wall and a base tier extending from the top tier. The base tier is larger in size than the top tier to facilitate nesting of adjacent weights, and a step is formed at the intersection of the top tier and the base tier. An attachment member extends from the weight and provides a tethering point for lighter-than-air balloons.

10 Claims, 9 Drawing Sheets

STACKABLE WEIGHTS FOR LIGHTER-THAN-AIR BALLOONS

FIELD OF THE INVENTION

The present invention generally resides in the art of lighter-than-air balloons and accessories. More particularly, the present invention relates to an adjustable weight for lighter-than-air balloons.

BACKGROUND OF THE INVENTION

Lighter-than-air balloons may be displayed singly or in groups both for decorative purposes as well as to celebrate various events, functions, etc. For example, one or more balloons are frequently used as centerpieces at various functions, and may include bright colors or inscribed images or messages reflecting the nature of the event or function. Both mylar and latex balloons are frequently filled with helium to render them lighter-than-air. Helium, which is a lighter-than-air gas, causes an upward lift to act on the balloon. Therefore, balloons filled with helium frequently need to be tied by means of a string or otherwise secured to an object to prevent them from floating away.

In the past, lighter-than-air balloons have been tethered down by tying a string to each balloon at an upper end and to an object that rests on a surface, or the surface itself, at a lower end. Where suitable objects for tethering the balloons are not provided on the surface, weights may be provided to tether the balloons and prevent them from floating away. However, because balloons come in different sizes and, therefore, have different volumes, they receive smaller or larger amounts of helium, resulting in different levels of lift. Thus, a single weight may not be suitable for anchoring a plurality of different sized balloons. If the weight does not have sufficient mass it will not perform the intended tethering of the balloon (s), and if the weight has excess mass its cost might be unnecessarily high. This problem is exacerbated by the bundling of multiple balloons together. In such an instance, a weight of significant greater mass will be needed or individual weights must still be provided for each individual balloon.

U.S. Pat. No. 6,666,405 discloses adjustable weights for weighing down differently sized lighter-than-air balloons. The adjustable weight includes at least two individual weights with a first means on each weight for selectively attaching two or more weights to each other and a second means for tethering the lighter-than-air balloon or balloons to the composite weight. While this provides adjustability in the mass of the composite weight, the designs disclosed are complicated and difficult to manufacture.

Notably, lighter-than-air balloon weights are often purchased in large quantities to accommodate events or functions where a significant number of lighter-than-air balloons are displayed. In such cases, the cost of each individual weight is an important consideration. The individual weights that are joined to form the adjustable weights disclosed in U.S. Pat. No. 6,666,405 require manufacturing and production methods that are timely and costly, thereby increasing the market cost of the device. In addition, the complicated adjustable weights of the prior art are unnecessarily difficult to assemble, making set-up of displays of the lighter-than-air balloons more time consuming.

Thus, there is a need for an adjustable weight for lighter-than-air balloons that has a simple structure and is easy to manufacture and employ.

SUMMARY OF THE INVENTION

In one or more embodiments, the present invention provides a weight for tethering lighter-than-air balloons including a top wall and a side wall extending from a periphery of the top wall and defining an inner volume. The side wall has a top tier adjacent to the top wall and a base tier extending from the top tier opposite the top wall to define an open end. An attachment member is provided and is adapted to provide a tethering point for a lighter-than-air balloon.

In one or more embodiments, the present invention provides an adjustable weight for tethering lighter-than-air balloons including a first weight and a second weight. Each of the weights includes a top wall and a side wall extending from a periphery of the top wall and defining an inner volume. The side wall havs a top tier adjacent to the top wall and a base tier extending from the top tier opposite the top wall, the base tier being larger than the top tier. The base tier of the first weight receives the top tier of the second weight therein. The first and second weights are secured together by friction forces, and may be devoid of ribs and recesses for securing the adjacent weights together.

DETAILED DESCRIPTION OF ILLUSTRATIVE EMBODIMENTS

With reference to FIGS. 1-5, an adjustable weight is shown and indicated generally by the numeral 10. The adjustable weight 10 includes one or more individual weights 12 nested together. The adjustable weight is adapted to be used with lighter-than-air balloons which, when filled with helium or other lighter-than-air gas, create a predetermined lift. The number of individual weights nested together to form the adjustable weight 10 in a particular instance will depend upon the size and lift of the lighter-than-air balloon or balloons to be secured thereto. The embodiment of the invention depicted in FIGS. 1-5 shows two individual weights 12 and 14 nested together to form the adjustable weight 10, but it is contemplated that more or less individual weights may be used depending upon the size and lift of the balloon. For example, in the case of a small lighter-than-air balloon that provides little lift, a single individual weight 12 may be employed. In the case of a larger lighter-than-air balloon that provides significant lift, a plurality of individual weights 12 may be nested together to form an adjustable weight 10 capable of preventing the lighter-than-air balloon from floating away.

Figure 1:
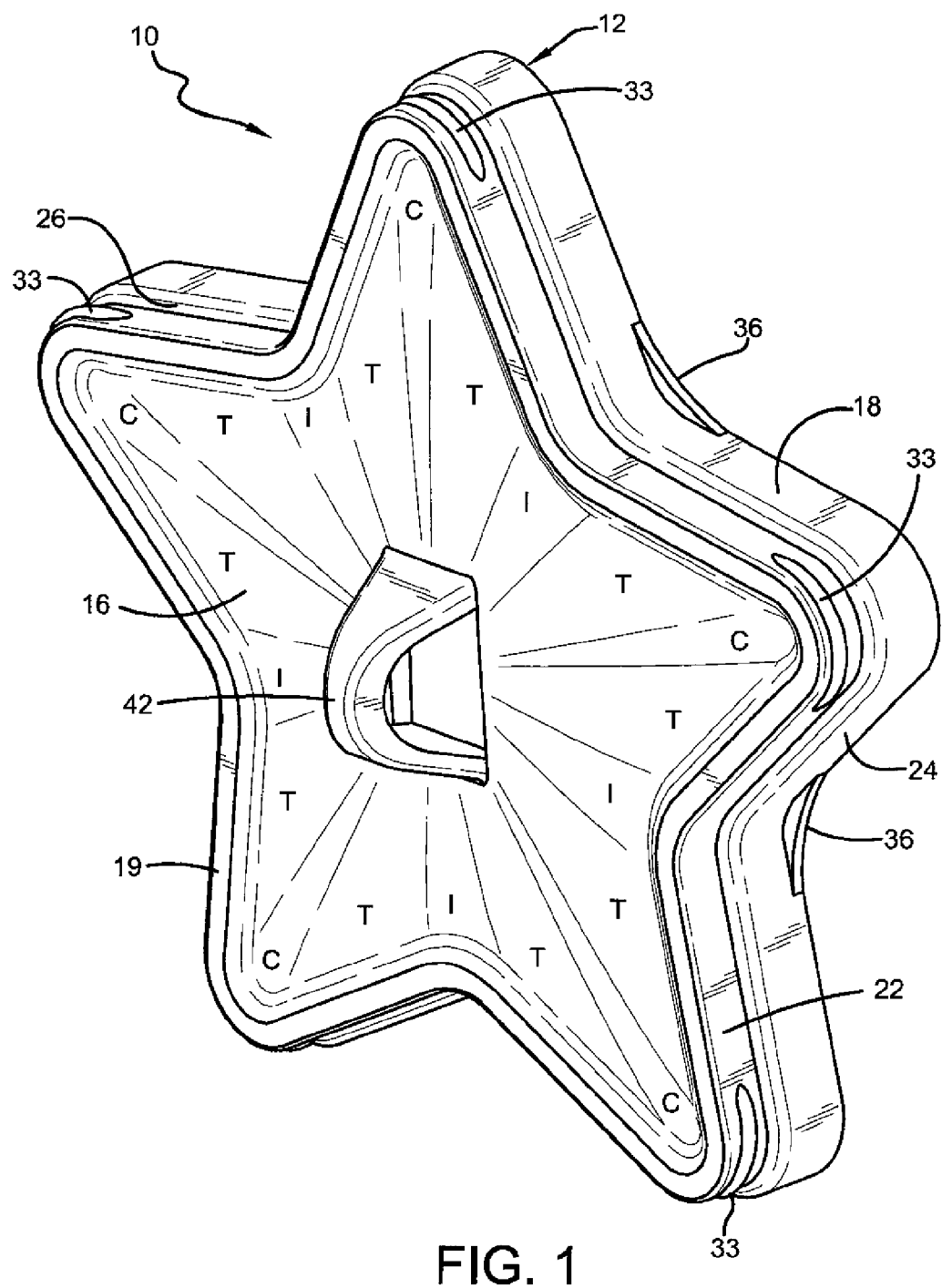
FIG. 1 is a perspective view of a balloon weight according to the concepts of the present disclosure.
Figure 2:
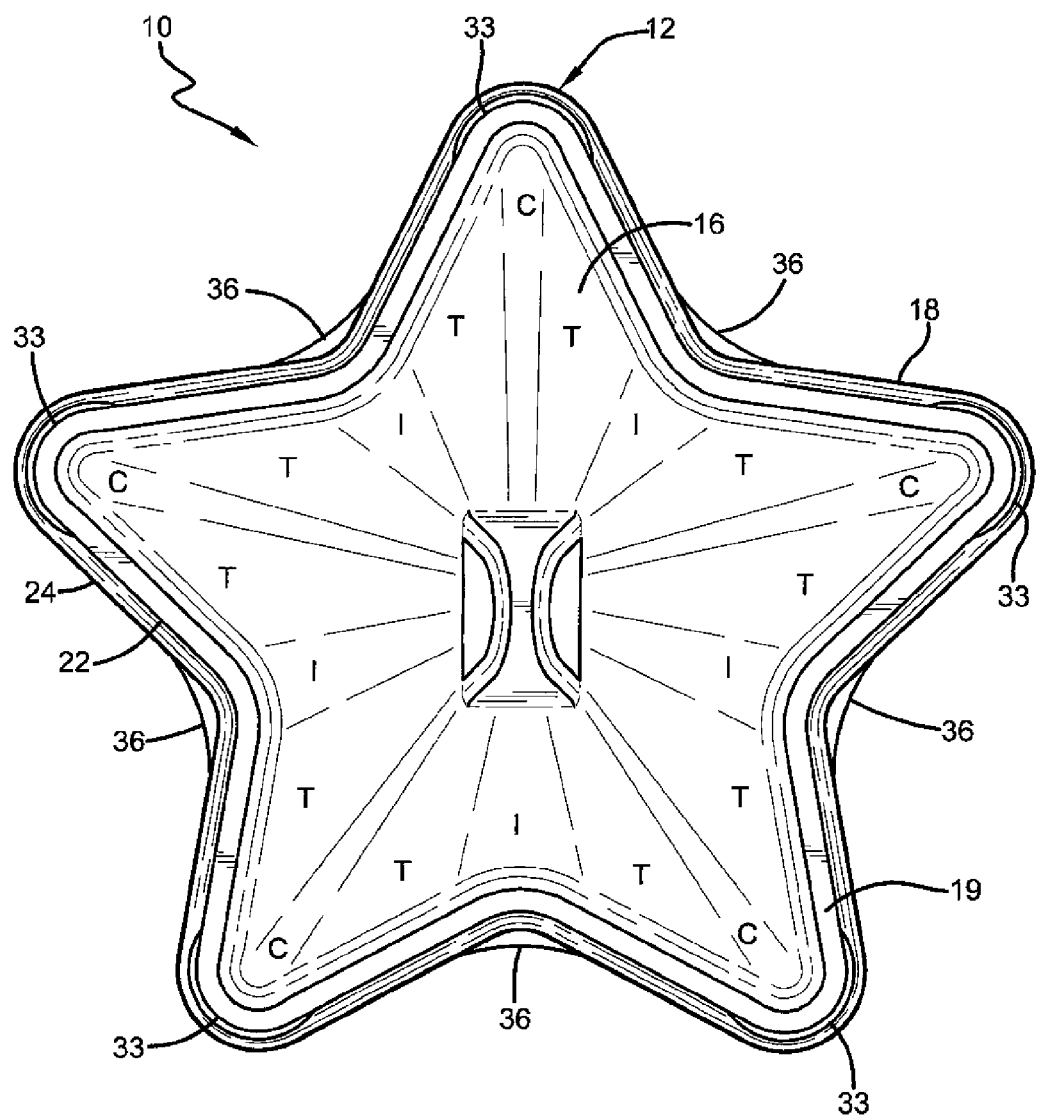
FIG. 2 is a top plan view of the balloon weight of FIG. 1.

Individual weights 12 (also referred to herein as weights 12) are identical and therefore a description of only one of the individual weights will be provided below. It will be appreciated by those skilled in the art that the below description of a single individual weight 12 applies to each of the individual weights that are nested together. The weight 12 is generally cup-shaped, or cupular, and includes a top wall 16 and a side wall 18 projecting from a periphery of the top wall 16. When in use, the individual weight 12 will resemble an inverted cup with the top wall 16 being positioned above and supported by the side wall 18. As shown in FIG. 1, the weight 12 may be generally star-shaped when viewed from the top, having five points spaced about a center point. However, it should be appreciated that the profile shape of the weight 12, as viewed in FIG. 1, may be any decorative or festive shape as desired. For example, the weight 12 may, when viewed from above, have a profile shape of a circle, square, rectangle, heart, or any other desired shape or configuration including more complicated shapes mimicking animals or other items and objects. A rib 19, perhaps best appreciated from FIGS. 3 and 4, may be provided around a periphery of the top wall 16. The rib 19 projects upwardly from top wall 16 and acts to strengthen and improve the structural integrity of the weight 12, as will be appreciated by those skilled in the art.

Although this invention is not to be limited by specific dimensions, the side wall 18 may, in some embodiments, have a thickness of between approximately 0.02 and 0.08 inches. In a particular embodiment, side wall 18 has a thickness of approximately 0.05 inches. Regardless of the profile shape of the weight 12, the side wall 18 of weight 12 includes a top tier 22 extending from the top wall 16 and a base tier 24 extends from the top tier 22. A step 26 defines the transition from the top tier 22 to the base tier 24, with the base tier 24 being positioned laterally outward of the top tier 22. Thus, the base tier 24 establishes a perimeter that is larger in size than the perimeter of the top tier 22 to facilitate the nesting of individual weights 12 together to form the adjustable weight 10. The top tier 22 and the base tier 24 are sized to create a friction fit between the nested weights 12 when assembled. The top tier 22 nests into the base tier 24 by being inserted therein. The friction created between adjacent weights adequately secures them together to form weight 10 while also allowing for easy removal of one or more weights as needed. Notably, no complicated or expensive mechanisms are needed to secure adjacent weights 12 together.

The top wall 16 and the side wall 18 define an inner volume 20 that is open to the atmosphere and adapted to receive another individual weight 12 therein. In certain embodiments, the base tier 24 of the side wall 18 may be angled slightly from parallel relative to the top tier 22 so that the base tier 24 projects outwardly. In certain embodiments, the base tier 24 may be angled between approximately 0 and 5° relative to the top tier 22. In a particular embodiment, the base tier 24 may be angled approximately 1.0° relative to the top tier 22. The angle of base tier 24 facilitates the insertion of the top tier 22 of an adjacent weight 12 into the inner volume 20. In other embodiments, the base tier 24 and the top tier 22 may be oriented generally parallel to one another.

Top tier 22 includes an inner surface 27 adjacent to the inner volume 20, and an outer surface 28 on an exterior of the sidewall 18. Likewise, base tier 24 includes an inner surface 30 adjacent to the inner volume 20, and an outer surface 32 on an exterior of the sidewall 18. Each point on the outer surface 28 of the top tier 22 has a radius, or distance from the center, approximately equal to but slightly larger than the radius at a corresponding point on the inner surface 30 of the base tier 24. In this way contact and pressure is generated between the two surfaces when the weights 12 are nested together, and this creates the desired friction fit. In certain embodiments, between approximately 0.001 and 0.009 inches of interference is provided between the outer surface 28 of the top tier 22 and the inner surface 30 of the base tier 24. In a particular embodiment, approximately 0.005 inches of interference is provided between the two surfaces. As will be appreciated by those skilled in the art, base tier 24 may deform slightly by virtue of its material characteristics to accommodate insertion of the slightly larger top tier 22.

Sufficient contact is provided between the outer surface 28 of the top tier 22 and the inner surface 30 of the base tier 24 to create enough friction to adequately secure two adjacent weights 12 together. In certain embodiments, the magnitude of contact or engagement between the outer surface 28 of the top tier 22 and the inner surface 30 of the base tier 24 may include substantially the entire height of the inner surface 30 and the outer surface 28. In other embodiments, the magnitude of contact between the two surfaces may include only a portion of the height of the inner surface 30 and the outer surface 28. In a particular embodiment, the magnitude of contact between the two surfaces may be between approximately 0.12 and 0.2 inches. In a specific embodiment, the magnitude of contact between the two surfaces may be approximately 0.16 inches.

In one or more embodiments, the individual weights 12 may be devoid of any ribs and and/or recesses designed to join two stacked individual weights together. For example, prior art stackable weights often include an outwardly or inwardly projecting rib and an outwardly or inwardly extending recess on each individual weight, with the ribs adapted to engage the recesses of adjacent individual weights when stacked. These ribs and recesses are necessary in prior art designs to adequately secure the adjacent individual weights together. However, the ribs and recesses add complexity to the design, difficulty to the manufacturing processes, and cost to the weight. The friction fit of the present invention, as described above, is sufficient to secure two adjacent individual weights 12 together without resort to such interlocking mechanisms. In certain embodiments, the ribs 33 and recesses 34 may be provided as a secondary attachment mechanism in addition to the friction fit attachment of the nested weights.

In certain embodiments, the individual weight 12 may be made of a plastic material having properties that allow the individual weight 12 to flex slightly upon nesting of another weight therein. More specifically, in a particular embodiment individual weight 12 may be made of a crystal polystyrene.

In one or more embodiments, the material used to form the individual weight 12 may have a tensile strength (yield, at 73° F.), according to test methods consistent with ASTM D638, of greater than 4500 psi, in other embodiments greater than 5000 psi, in other embodiments greater than 5500 psi, in still other embodiments greater than 6000 psi, and in yet other embodiments greater than 6250 psi. In the same or other embodiments, the material used to form the individual weight 12 may have a tensile strength (yield, at 73° F.), according to test methods consistent with ASTM D638, of less than 8500 psi, in other embodiments less than 8000 psi, in other embodiments less than 7500 psi, in still other embodiments less than 7000 psi, and in yet other embodiments less than 6500 psi.

In one or more embodiments, the material used to form the individual weight 12 may have a flexural modulus (73° F.), according to test methods consistent with ASTM D790, of greater than 300000 psi, in other embodiments greater than 350000 psi, in other embodiments greater than 400000 psi, in still other embodiments greater than 425000 psi, and in yet other embodiments greater than 450000 psi. In the same or other embodiments, the material used to form the individual weight 12 may have a flexural modulus (73° F.), according to test methods consistent with ASTM D790, of less than 650000 psi, in other embodiments less than 600000 psi, in other embodiments less than 550000 psi, in still other embodiments less than 500000 psi, and in yet other embodiments less than 475000 psi.

In one or more embodiments, the material used to form the individual weight 12 may have a flexural strength (73° F.), according to test methods consistent with ASTM D790, of greater than 9000 psi, in other embodiments greater than 9500 psi, in other embodiments greater than 10000 psi, in still other embodiments greater than 10500 psi, and in yet other embodiments greater than 11000 psi. In the same or other embodiments, the material used to form the individual weight 12 may have a flexural strength (73° F.), according to test methods consistent with ASTM D790, of less than 15000 psi, in other embodiments less than 14500 psi, in other embodiments less than 14000 psi, in still other embodiments less than 13500 psi, and in yet other embodiments less than 13000 psi.

One or more pull tabs 36 may be provided on an exterior of the side wall 18 to facilitate disassembly of the adjustable weight 10. In the embodiment shown in FIGS. 1-5, a pull tab is provided between adjacent points of the star. Pull tabs 36 are generally planar, and may be generally parallel to the top wall 16. It is contemplated that the pull tabs 36 may be provided in any number and any desired arrangement depending upon the shape of the individual weight 12 and the force required to overcome the friction fit between adjacent weights 12 of the adjustable weight 10. In certain embodiments, the pull tabs 36 may be formed integrally with the side wall 18.

Figure 3:
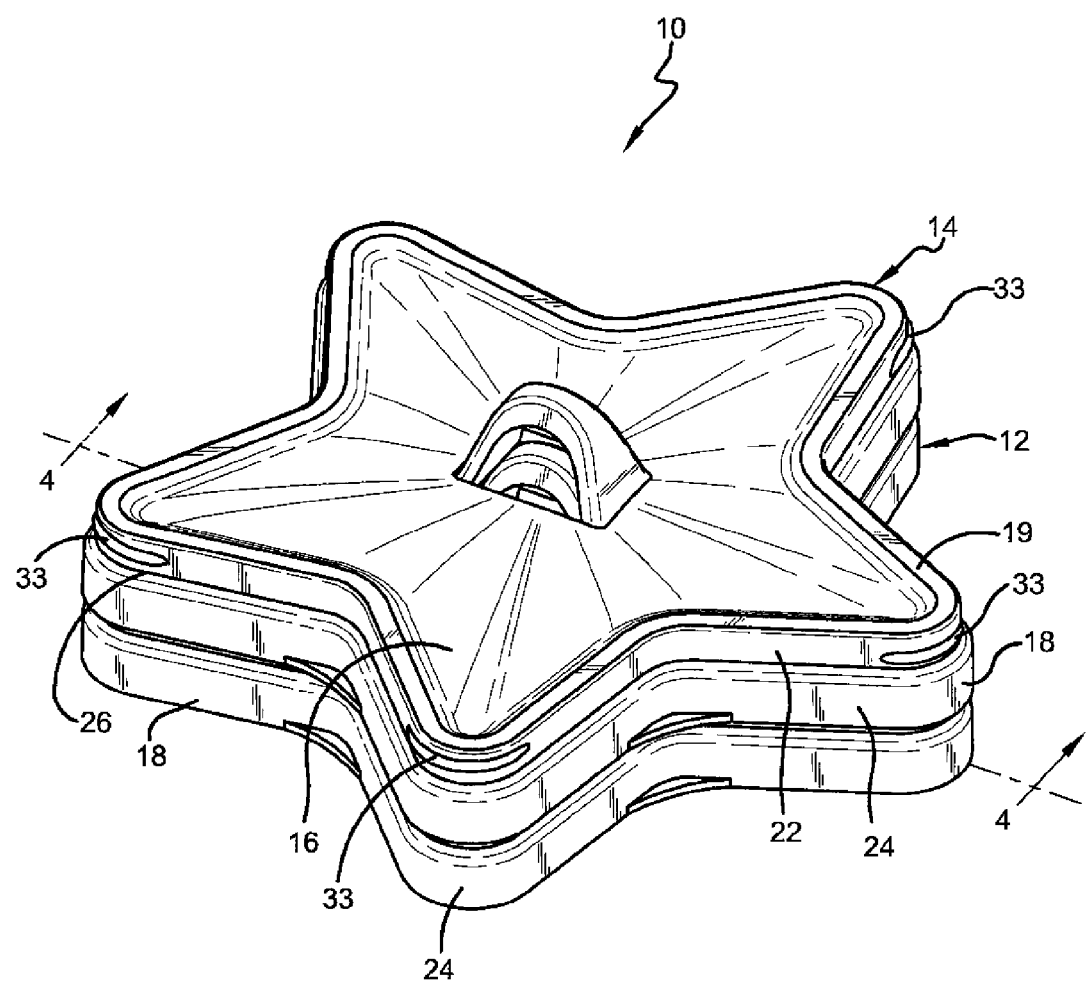
FIG. 3 is a perspective view of two nested balloon weights according to the concepts of the present disclosure.
Figure 4:
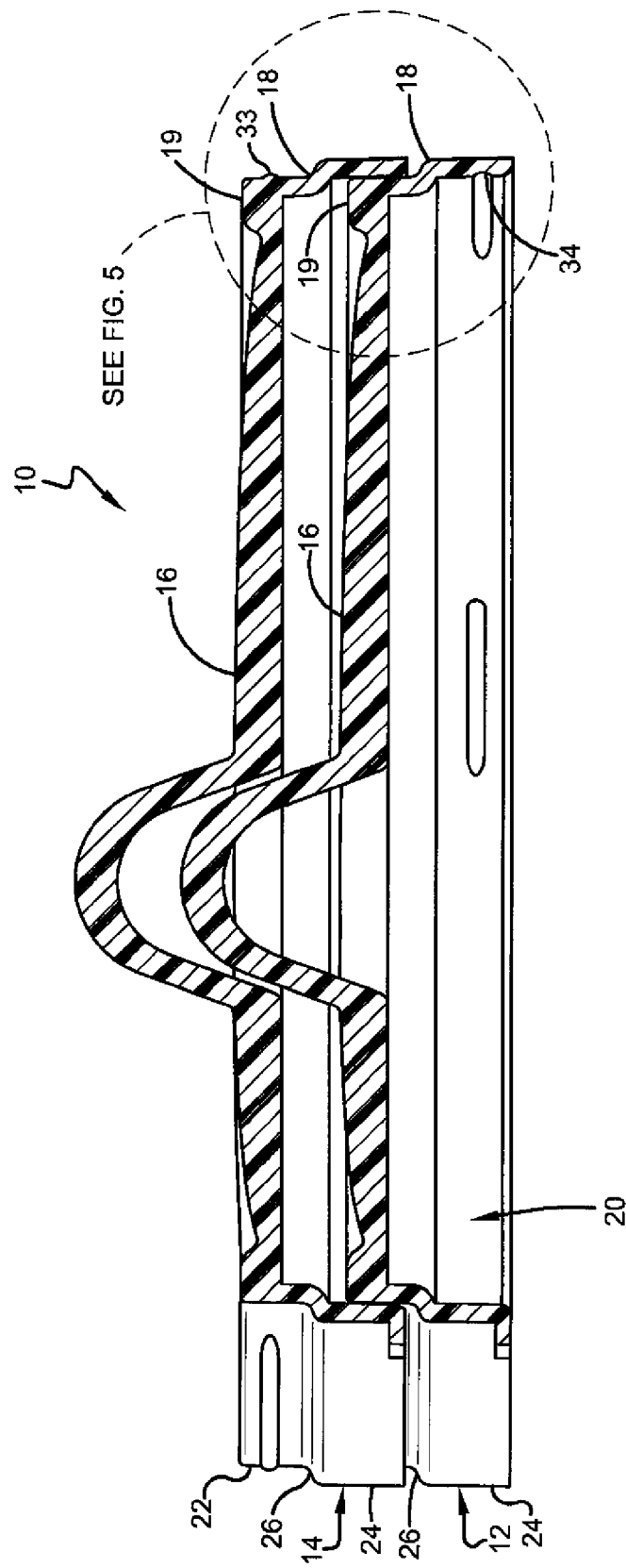
FIG. 4 is a sectional view of the nested balloon weights taken generally along line 4-4 of FIG. 3.
Figure 5:
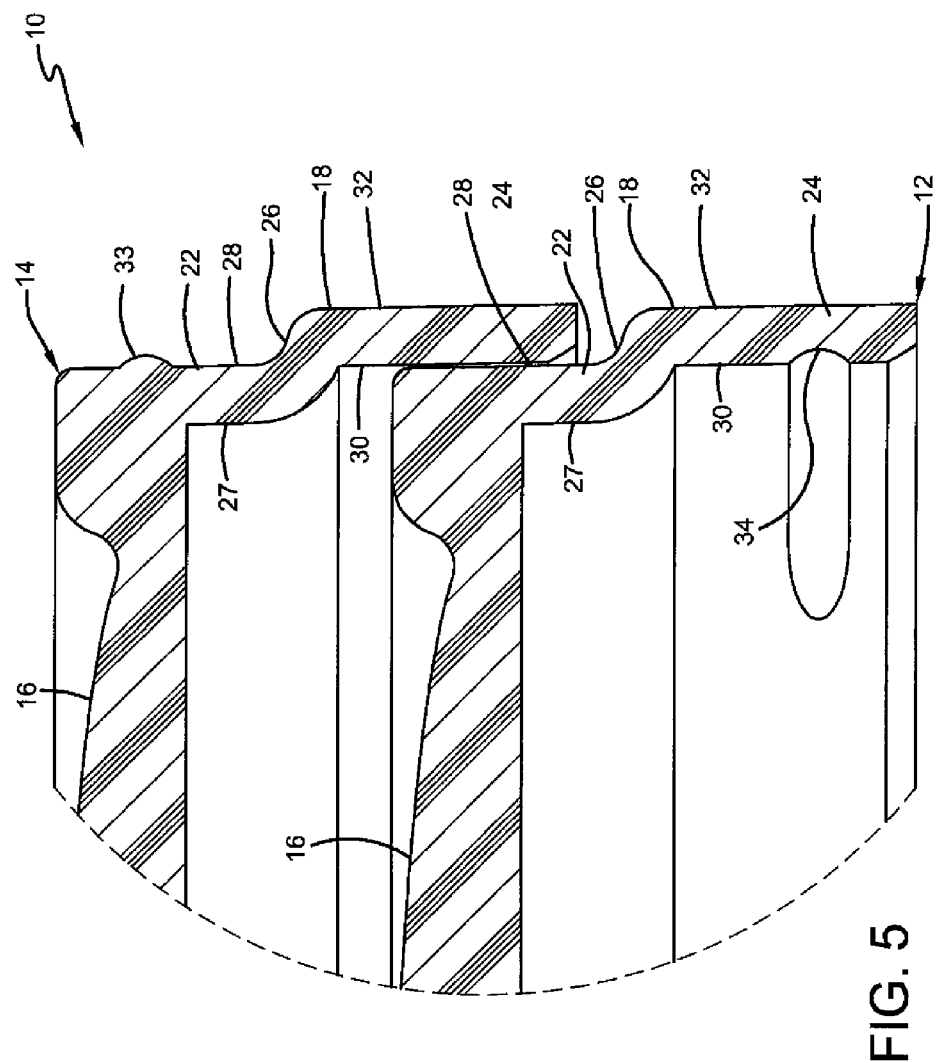
FIG. 5 is a fragmentary enlarged sectional view of the nested balloon weights as indicated in FIG. 4.
Figure 6:
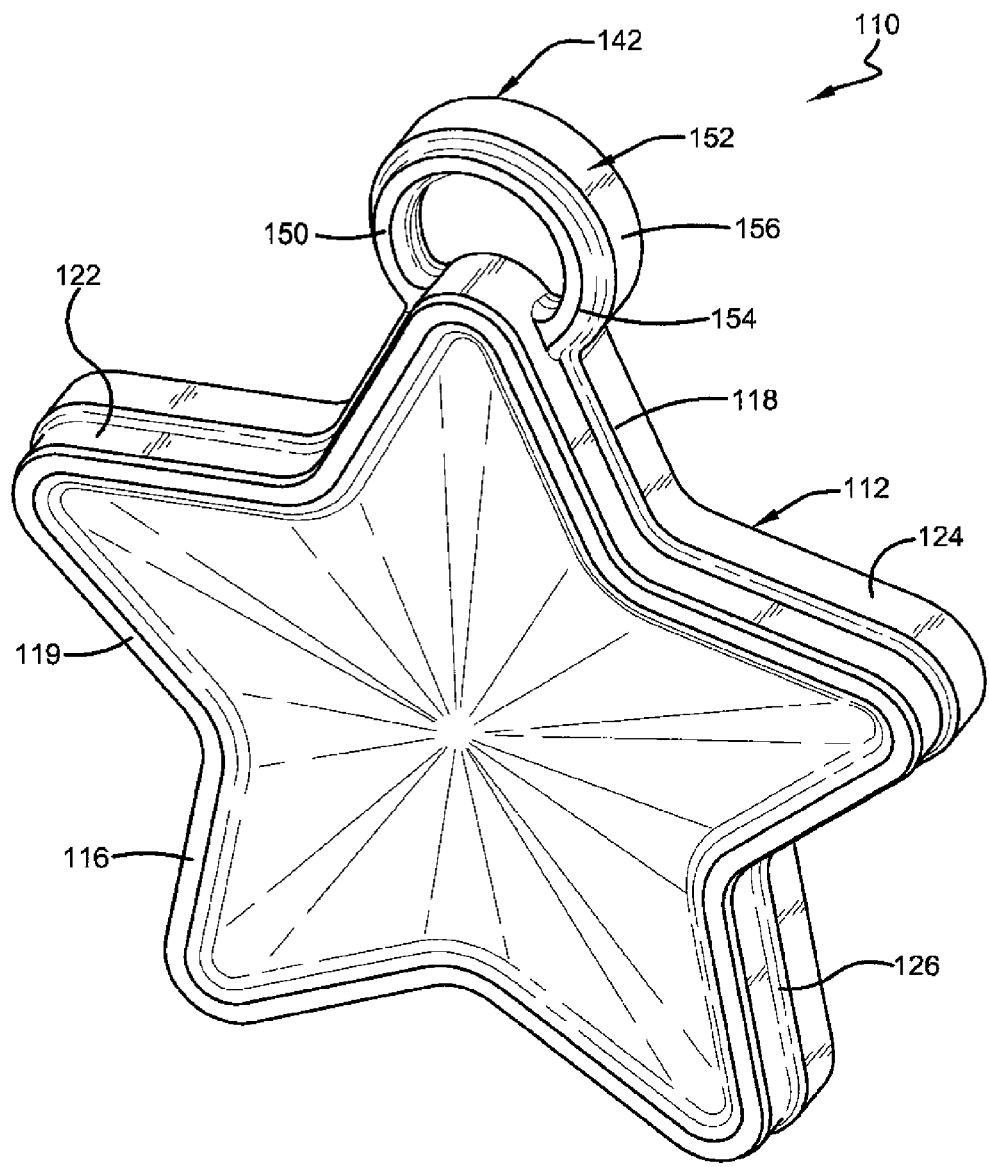
FIG. 6 is a perspective view of a second embodiment of a balloon weight according to the concepts of the present disclosure.
Figure 7:
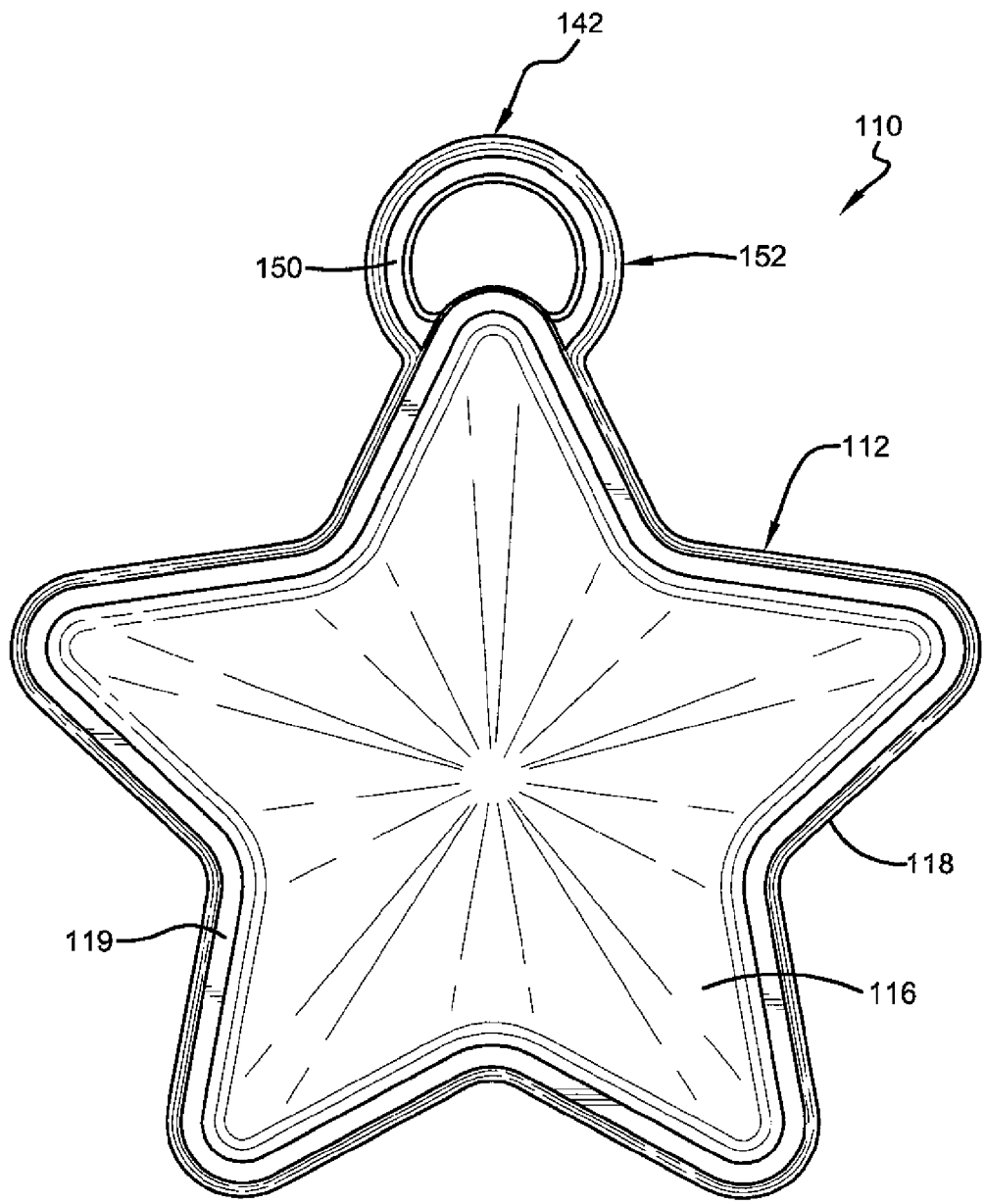
FIG. 7 is a top plan view of the balloon weight of FIG. 6.
Figure 8:
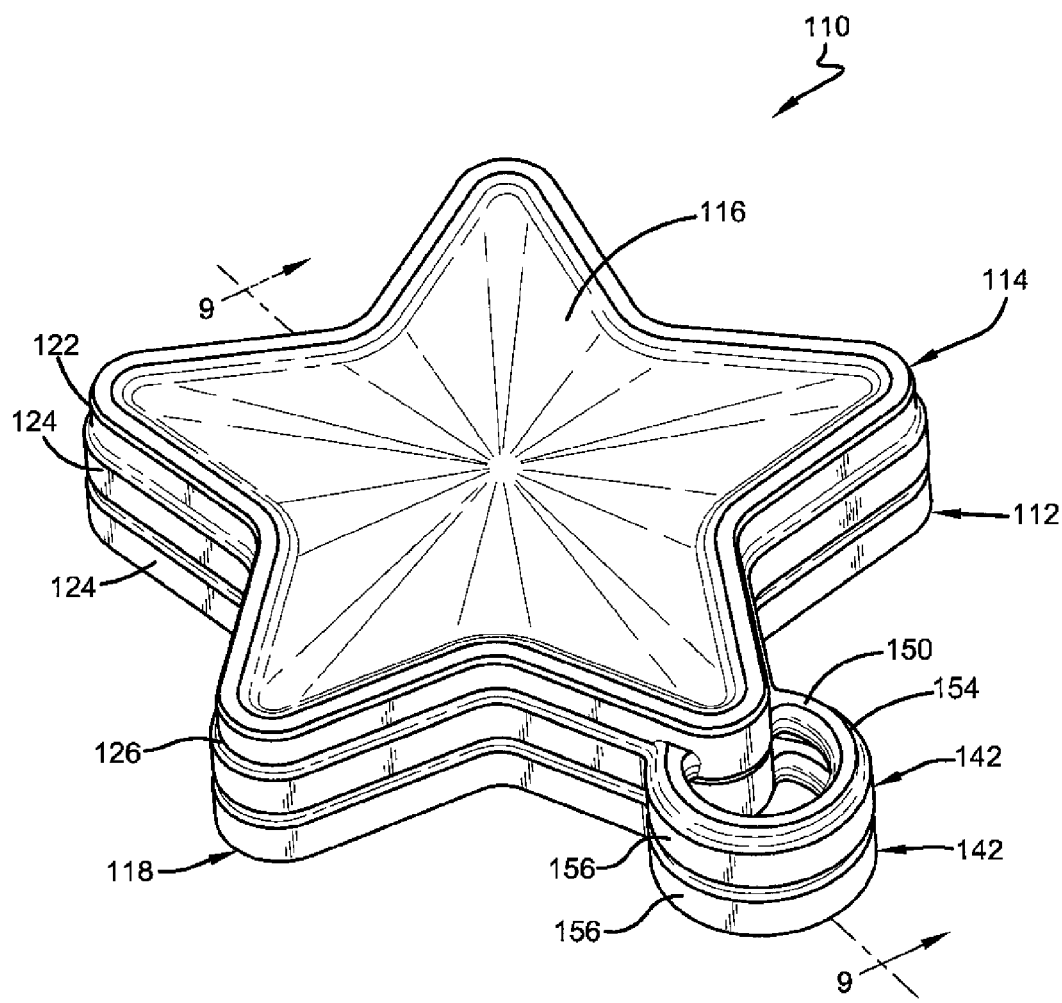
FIG. 8 is a perspective view of two balloon weights as shown in FIG. 6 nested with one another according to the concepts of the present disclosure.
Figure 9:
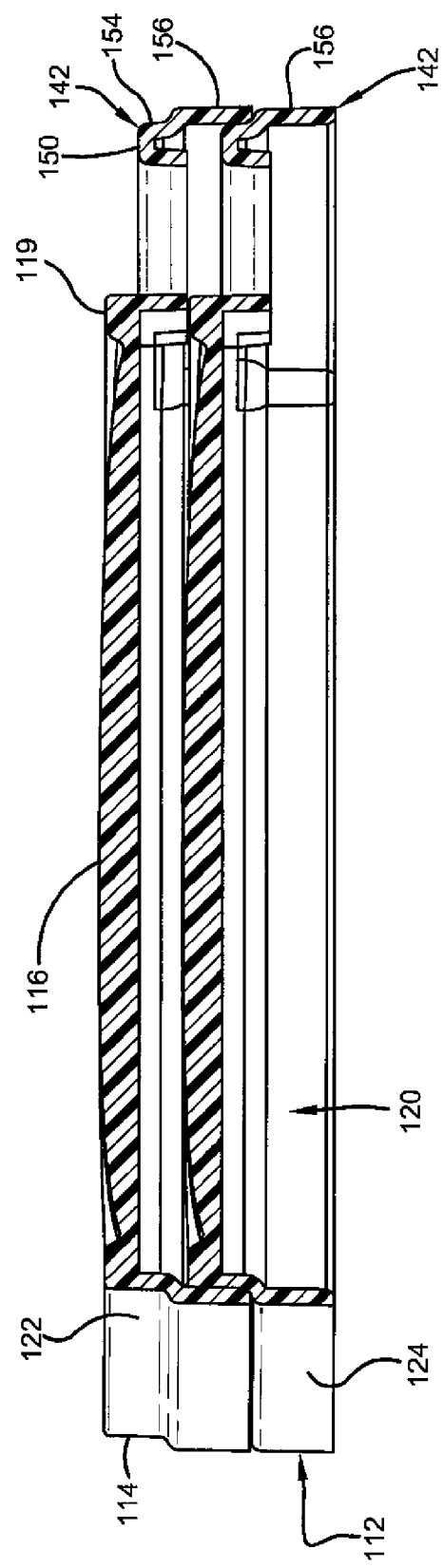
FIG. 9 is a sectional view of the nested balloon weights taken generally along line 9-9 of FIG. 8.

An opening or hole 40 is provided in the top wall 16 of individual weight 12. While the opening 40 may be provided in any desired shape or arrangement, FIGS. 1-5 depict an opening 40 that is generally rectangular in shape. An attachment member 42 extends from the top wall 16 adjacent to the opening 40. In the particular embodiment shown, the attachment member 42 is arcuate in shape and extends from one edge of the opening 40 to an opposite edge. As can be best seen in FIG. 2, attachment member 42 and opening 40 form an angled inner profile that progressively decreases in size at it extends from the top wall 16. This angled inner profile facilitates nesting or stacking of multiple individual weights 12 by accommodating the attachment member 42 of an adjacent weight 12. When multiple weights 12 are nested, as seen in FIGS. 3-5, an upper portion of attachment member 42 of the bottom weight 12 extends through opening 40 in the top weight 12 and generally conforms to the inner surface of the attachment member 42 of the top weight. The attachment member 42 may also be tapered in the width direction, becoming progressively smaller as it extends away from the top wall 16. This taper also facilitates stacking of the individual weights 12. The attachment member 42 creates an attachment point for a string or other connecting device secured at an opposite end to a lighter-than-air balloon. In certain embodiments, the attachment member 42 may be formed integrally with the top wall 16.

In certain embodiments, the top surface 16 of weight 12 may be provided with a plurality of regions having varying radiuses to form an irregular outer surface. The irregular outer surface, when formed of crystal polystyrene, may create light reflection and refraction patterns that add to the aesthetic appeal of the weights 12. In the embodiment of the invention shown in FIG. 1, a center region C is provided on each point of the star shaped weight 12 that has a first radius of between approximately 0.5 and 1.5 inches. The center region C provides an apex (in this embodiment at the centerline of each arm of the star) and is round convexly from that apex. A transition region T is provided on both sides of the center region C and has a radius of between approximately 1.0 and 3.0 inches. The transition region T continues the convex rounding of center region C. An intermediary region I is provided between transition regions T and has a radius of between approximately 6.0 and 12.0 inches. The intermediary region I provides a valley (in this embodiment, at the centerline joining each arm of the star) and is rounded concavely from that valley. The varying radius of the top surface 16 is minor, and may not immediately be detectable by the naked eye, yet nonetheless creates a noticeable visual effect when light reflects off of the top surface 16. The effect helps to create a weight 12, and an adjustable weight 10, that is not only functional, but also decorative and festive.

Referring now to FIGS. 6-9, an alternative embodiment of the adjustable weight is shown and is indicated generally by the numeral 110. The adjustable weight 110 is substantially similar to adjustable weight 10, and like components are numbered accordingly. Only the differences between weight 110 and weight 10 will be discussed below.

Individual weight 112 of weight 110 does not include an opening and attachment member as described with respect to individual weight 12 at opening 40 and attachment member 42. Instead, an attachment member 142 is provided at the end of one point of the star shaped weight, and forms a part of the outer profile of weight 112. Attachment member 142 is generally circular in shape, and includes a top wall 150 and a side wall 152 similar to the top wall 116 and the side wall 118 of weight 112. The side wall 152 of attachment member 142 also includes a top tier 154 and a base tier 156 to facilitate nesting of the attachment members 142 along with the weights 112. Thus, it is contemplated that the attachment member 142 may be provided as an outward projection from the side wall 118 of weight 112, as shown in FIGS. 6-9, rather than an upwardly extending projection 42 as shown in FIGS. 1-5.

Notably, each embodiment of the adjustable weight 10 and 110, and the individual weights 12 and 112, is devoid of undercuts. Thus, the weights 12 and 112 can be molded by a straight pull method. Use of a straight pull mold allows for inexpensive manufacturing of weights 12 and 112, and thereby results in a reduced market price as compared to alternative designs having complicated connecting mechanisms.

In light of the foregoing, it should be appreciated that the present invention significantly advances the art by providing an adjustable weight that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A balloon display comprising:
   a weight for tethering lighter-than-air balloons including:
   (a) a top wall,
   (b) a side wall extending from a periphery of the top wall and defining an inner volume, said side wall having a top tier adjacent to said top wall and a base tier extending from said top tier opposite said top wall to provide an open end, and
   (c) an attachment member providing a tethering point for a lighter-than-air balloon; and
   a lighter-than-air balloon tethered to said attachment member, wherein said base tier is larger than said top tier and said top tier and base tier are structured such that a top tier of an identical weight nests in said bottom tier and engages it through a friction fit to create a composite weight upon inserting the top tier of an identical weight into said open end of said base tier.

2. The balloon display of claim 1, wherein a step defines the transition from said top tier to said base tier.

3. The balloon display of claim 2, wherein said sidewall, at said top tier, is angled to project outwardly as it extends toward said open end; said sidewall, at said bottom tier, is angled to project outwardly toward said open end; and said sidewall, at said top tier, is angled outwardly to a greater degree than said sidewall, at said bottom tier, whereby a top tier of an identical weight inserted into said open end of said base tier creates a friction fit.

4. The balloon display of claim 3, wherein said sidewall at said base tier is angled approximately 1.0° relative to said sidewall at said top tier.

5. The balloon display of claim 1, further comprising an opening in said top wall, wherein said attachment member extends from opposing edges of said opening.

6. The balloon display of claim 5, wherein said attachment member is arcuate, and said attachment member and said opening have a tapered inner profile that become progressively smaller they extend from said top wall.

7. The balloon display of claim 1, wherein said attachment member extends from said side wall.

8. The balloon display of claim 1, further comprising at least one pull tab extending from said side wall.

9. The balloon display of claim 1, wherein said weight is formed of crystal polystyrene.

10. The balloon display of claim 9, wherein said top wall includes a plurality of regions on a top surface, said regions having varying radii to form a non-planar top surface creating a light-scattering effect.

* * * * *